(12) United States Patent
Schnell (10) Patent No.: US 8,166,735 B1
(45) Date of Patent: May 1, 2012

(54) PULL TYPE GANG MOWER

(75) Inventor: Tim Schnell, Macclesfield, NC (US)

(73) Assignee: Wing Product Development Corp., Wilson, NC (US)

( * ) Notice: Subject to any disclaimer, the term of this patent is extended or adjusted under 35 U.S.C. 154(b) by 2313 days.

(21) Appl. No.: 10/724,807

(22) Filed: Dec. 1, 2003

Related U.S. Application Data (63) Continuation-in-part of application No. 10/293,640, filed on Nov. 13, 2002, now abandoned.

(51) Int. Cl.
*A01D 75/30* (2006.01)

(52) U.S. Cl. ............................................. 56/6; 56/228

(58) Field of Classification Search ................ 56/6, 228; 172/311
See application file for complete search history.

(56) References Cited

U.S. PATENT DOCUMENTS

| | | | |
|---|---|---|---|
| 1,561,569 A | | 11/1925 | Roseman |
| 2,682,740 A | * | 7/1954 | Miller et al. .................. 56/6 |
| 2,720,740 A | * | 10/1955 | Price ............................... 56/13.6 |
| 3,208,207 A | * | 9/1965 | Bottenberg .................... 56/13.6 |
| 3,473,302 A | * | 10/1969 | Caldwell ........................... 56/6 |
| 3,514,126 A | | 5/1970 | Fuss |
| 3,608,284 A | | 9/1971 | Erdman |
| 3,699,752 A | | 10/1972 | Dandl |
| 3,950,923 A | | 4/1976 | Martensen et al. |
| 4,135,349 A | | 1/1979 | Schwertner |
| 4,160,356 A | | 7/1979 | Mathews |
| 4,304,086 A | | 12/1981 | Stuchl |
| 4,346,547 A | * | 8/1982 | Allison .......................... 56/13.6 |
| 4,420,925 A | | 12/1983 | Webster |
| 4,691,504 A | | 9/1987 | Glunk |
| 4,697,404 A | | 10/1987 | Brockmeier et al. |
| 4,723,404 A | * | 2/1988 | Aron ................................ 56/370 |
| 4,815,259 A | | 3/1989 | Scott |
| 4,858,417 A | | 8/1989 | Priefert et al. |
| 4,870,810 A | | 10/1989 | Gordy |
| 4,901,507 A | | 2/1990 | Cracraft |
| 4,926,621 A | | 5/1990 | Torras |
| 5,062,489 A | * | 11/1991 | Adee ............................... 172/311 |
| 5,069,022 A | | 12/1991 | Vandermark |
| 5,109,655 A | * | 5/1992 | Tekulve ............................... 56/6 |
| 5,133,174 A | | 7/1992 | Parsons, Jr. |
| 5,233,817 A | | 8/1993 | Nicol |
| 5,771,669 A | | 6/1998 | Langworthy et al. |
| 5,851,020 A | | 12/1998 | Godwin et al. |
| 6,038,842 A | | 3/2000 | Quiroga |

(Continued)

FOREIGN PATENT DOCUMENTS

| | | |
|---|---|---|
| AU | 278882 | 6/1963 |

(Continued)

*Primary Examiner* — Alicia Torres (74) *Attorney, Agent, or Firm* — Coats & Bennett, P.L.L.C.

(57) ABSTRACT

A gang-type lawn mower system comprises a main frame and a plurality of mower decks secured to the main frame. Mounted on the frame is a power source such as an internal combustion engine. A drive train is interconnected between the power source and each of the mower decks. Thus, each mower deck is driven by the single power source. Further, the frame structure includes a tongue that is adapted to be connected to a tractor. Therefore, in cutting grass, the frame structure is pulled over the ground and each of the mower decks, driven by the power source, cuts grass or other vegetation that passes under the mower deck. Additionally, each mower deck is pivotally connected to the frame structure about at least one pivot axis.

26 Claims, 9 Drawing Sheets

U.S. PATENT DOCUMENTS

| | | |
|---|---|---|
| 6,047,530 A | 4/2000 | Bednar |
| 6,065,274 A | 5/2000 | Laskowski et al. |
| 6,131,378 A | 10/2000 | Lees |
| 6,336,311 B1 | 1/2002 | Bednar |
| 6,336,312 B1 | 1/2002 | Bednar et al. |
| 2002/0053194 A1 | 5/2002 | Bergsten et al. |
| 2002/0078672 A1 | 6/2002 | Hubscher |

FOREIGN PATENT DOCUMENTS

| | | |
|---|---|---|
| CA | 580441 | 7/1959 |

* cited by examiner

PULL TYPE GANG MOWER

CROSS REFERENCE TO RELATED APPLICATION

This is a continuation-in-part of U.S. patent application Ser. No. 10/293,640, filed on Nov. 13, 2002 now abandoned and entitled "Pull Type Gang Mower."

FIELD OF THE INVENTION

The present invention relates to gang-type lawn mower systems and more particularly to a pull-type frame structure having a series of mower decks secured thereto with each mower deck powered by a single power source.

BACKGROUND OF THE INVENTION

Many homeowners are fortunate to own one to five acre tracts of land. In many of these cases, these homeowners will have lawns as large as one to four acres. These large lawns are certainly picturesque and add a quality to a home or homestead that is desirable. But like other things of beauty, a large lawn comes with a price. The time and effort required to cut such lawns can be burdensome.

The homeowner has a number of options. First, these large lawns can be cut with walk-behind mowers, either propelled or unpropelled. In either case, cutting a large lawn with a walk-behind mower is extremely time-consuming. Another option entails the use of a conventional garden tractor. However, again a conventional garden tractor will only cut a swath so wide and therefore the homeowner will find him or herself riding a garden tractor for hours. There are faster ways to cut large lawns. One is to employ a small farm tractor with a large rotator mower that would be attached either under the belly of the tractor or behind the tractor. Of course, there is an expense involved in purchasing a small farm tractor and a sizeable rotator cutter. Further, many homeowners with large lawns do not have outbuildings or garage space to store a small farm tractor.

There have been attempts at designing gang-type lawn mowers that could be pulled by a garden tractor or a small farm tractor. See for example, the disclosures found in the following U.S. Pat. Nos. 5,771,669; 5,133,174; 5,851,020; 4,926,621; 3,514,126; 4,870,810; and 3,608,284. The disclosure of these patents is expressly incorporated herein by reference. Most of the gang-type mower systems disclosed in these patents utilizes a series of lawn mowers coupled together where each lawn mower includes its own power source. This makes the entire system expensive and impractical.

Therefore, there has been and continues to be a need for an economical and practical gang-type lawn mower system that can be pulled by a conventional garden tractor or small farm tractor.

SUMMARY OF THE INVENTION

The present invention entails a gang-type lawn mower system adapted to be pulled by a garden tractor or small farm tractor. The system includes a frame structure and a plurality of unpowered mower decks mounted to the frame structure. Secured to the frame structure is a single power source such as an internal combustion engine. A drive train is interconnected between the power source and each of the mower decks for transferring torque or power from the power source to the respective mower decks.

In one particular embodiment, the drive train includes a single drive belt that is trained around a pulley or sheave mounted to an output shaft of the power source. From the sheave or pulley associated with the power source, the belt extends around a number of pulleys or sheaves associated with the mower deck. Therefore, as the output shaft of the power source is driven, one or more blades associated with each mower deck is likewise driven.

Also, the present invention entails a method for setting up a pull-type gang lawn mower system. This method entails securing at least two spaced-apart unpowered mower decks to a pull-type frame structure. To power the mower decks, a single power unit is mounted on the frame structure and drivingly interconnected with each of the lower decks. Therefore, as the pull-type lawn mower system is pulled over the ground, the spaced part mower decks are powered by the single power source. Thus, each of the unpowered mower decks is operative to cut grass or vegetation as the system is pulled over the ground.

The gang type lawn mower system also includes a wheel supported main frame or power source frame having a power source mounted thereon. At least two mower decks are movably connected to the main frame with each mower deck being movable between an operative lower position where the mower deck is operative to cut grass and an elevated stowed position where at least a portion of the mower deck overlies a portion of the main frame. A drive is interconnected between the power source and each of the mower decks such that each mower deck is powered by the power source mounted on the main frame.

In one particular embodiment of the present invention, the mower decks are pivotally connected along opposite sides of the main frame and to place the mower decks in the elevated stowed position, the mower decks are pivoted inwardly towards the main frame such that a portion of each mower deck lies over a portion of the main frame and wherein the underside of the mower decks face outwardly or at least partially upwardly.

In another embodiment of the present invention, the gang type lawn mower system is provided with a belt drive that extends between the power source of the main frame and each of the mower decks. To maintain tension on the drive belt or belts, there is provided a belt tensioner device that tends to bias or at least slightly push each mower deck outwardly from the main frame.

In another embodiment of the present invention, each of the mower decks can pivot with respect to the main frame. Therefore, as the lawn mower system moves over undulations, the mower decks can at least slightly float or move with respect to the main frame. There is provided with the lawn mower system of the present invention a device that will engage the mower decks and limit their movement. In one particular embodiment, there is provided an arm pivotally mounted to the main frame and extending outwardly therefrom for engaging the mower deck, directly or indirectly, wherein the engagement of the arm limits the movement of the mower deck with respect to the main frame.

Other objects and advantages of the present invention will become apparent and obvious from a study of the following description and the accompanying drawings, which are merely illustrative of such invention.

DESCRIPTION OF AN EXEMPLARY EMBODIMENT

With further reference to the drawings, the gang-type lawn mower system of the present invention is shown therein and indicated generally by the numeral 10. Before providing a more detailed discussion of the individual components of the lawn mower system 10, it may be beneficial to briefly review the main components, or subassemblies, of the lawn mower system. In that regard, lawn mower system 10 includes a frame structure indicated generally by the numeral 12. As will be appreciated from subsequent portions of this disclosure, the frame structure 12 is adapted to be pulled behind a tractor, such as a conventional garden tractor or a small size farm tractor. Mounted to frame structure 12 in spaced apart relationship is a pair of mower decks indicated generally by the numerals 14 and 16. Each mower deck is mounted to the frame structure 12 such that the mower deck can float or move with respect to the frame structure as the entire lawn mower system 10 traverses the ground. More particularly, each mower deck 14 and 16 is designed to pivot or move about both a transverse axis and a longitudinal axis. A power source 18 is mounted to the frame structure 12 and adapted to drive the mower decks 14 and 16. A drive train indicated generally by the numeral 20 is interconnected between the power source 18 and the respective mower decks 14 and 16. As will be appreciated from subsequent portions of this disclosure, the drive train 20 includes a drive belt and a series of sheaves that are together operative to transfer power from the power source 18 to the respective mower decks 14 and 16.

Figure 1:
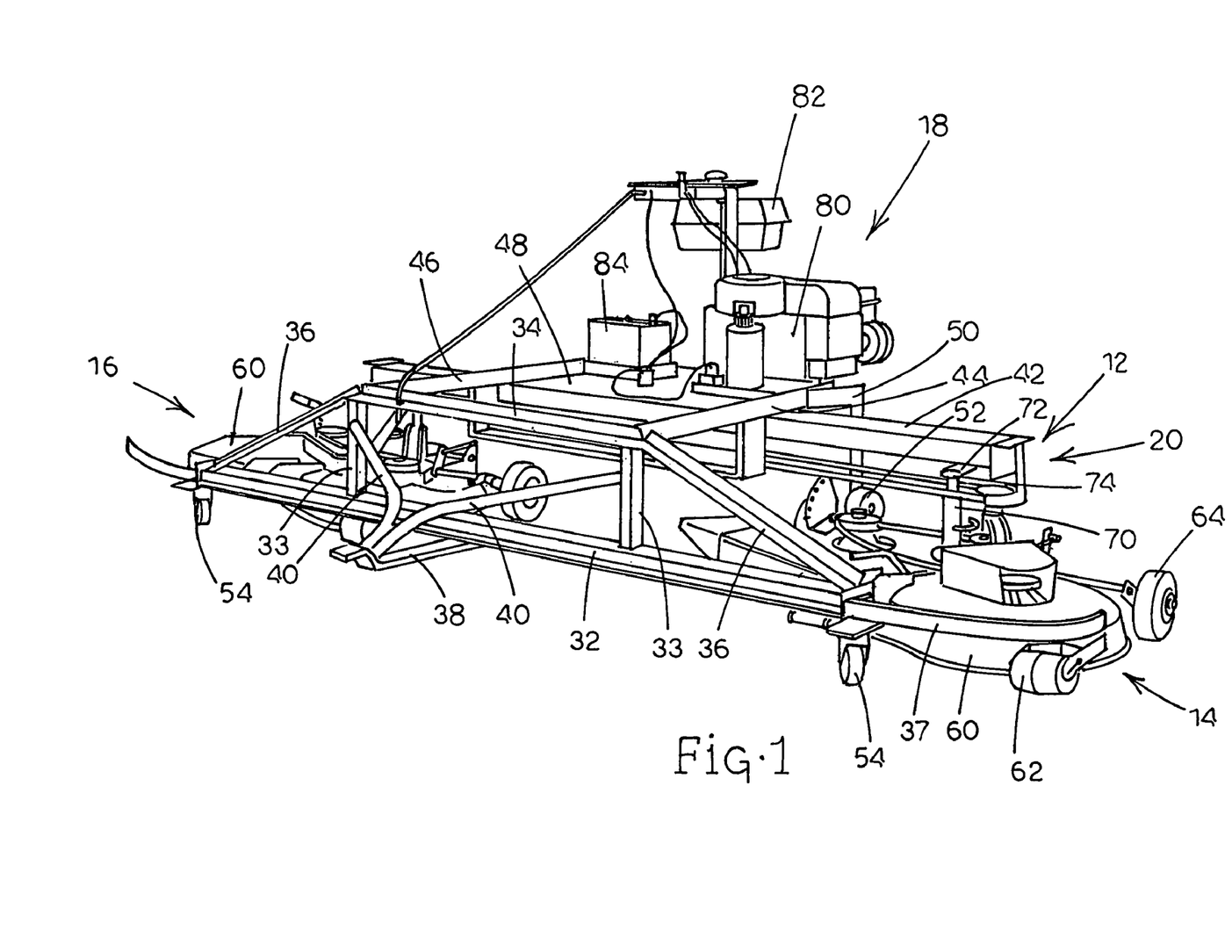
FIG. 1 is a perspective view of the gang-type lawn mower system of the present invention.

Turning to the frame structure 12, the frame structure 12 includes a front section that comprises a lower transverse member 32 and an upper transverse member 34. A pair of diagonal braces 36 extend from the outward ends of the lower transverse member 32 upwardly to where they join the upper transverse member 34. A pair of laterally spaced vertical members 33 extend upwardly from the lower transverse member 32 to the upper transverse member 34. Extending outwardly from the front section of the frame structure 12, on each side of the lawn mower system 10, is a bumper 37. Bumper 37 generally curls around the front portion of each mower deck 14 and 16 and generally protects the mower deck from impacting against trees, shrubs, fence posts and the like. Extending forwardly from the lower transverse member 32 is an elongated tongue 38. Tongue 38 is supported by a pair of upper tongue supports 40 that extend forwardly and inwardly from the vertical members 33.

Frame structure 12 further includes a rear transverse member 42. Connected between the rear transverse member 42 and the upper front transverse member 34 is a pair of longitudinal frame members 44 and 46. Provided on the frame structure about the rear portion is a platform 48. As will be appreciated from subsequent portions of this disclosure, platform 48 serves to receive and support the power source 18.

Frame structure 12 is wheel supported and is adapted to move over the ground while the mower decks 14 and 16 cut grass or other vegetation. Accordingly, frame structure 12 is provided with a pair of front wheels 54. Additionally, there is provided a wheel arm 50 that is disposed about the rear of the frame structure 12 and extends downwardly from the upper portion of the frame structure 12. A rear wheel 52 is mounted to the lower terminal end of the wheel arm 50.

Figure 3:
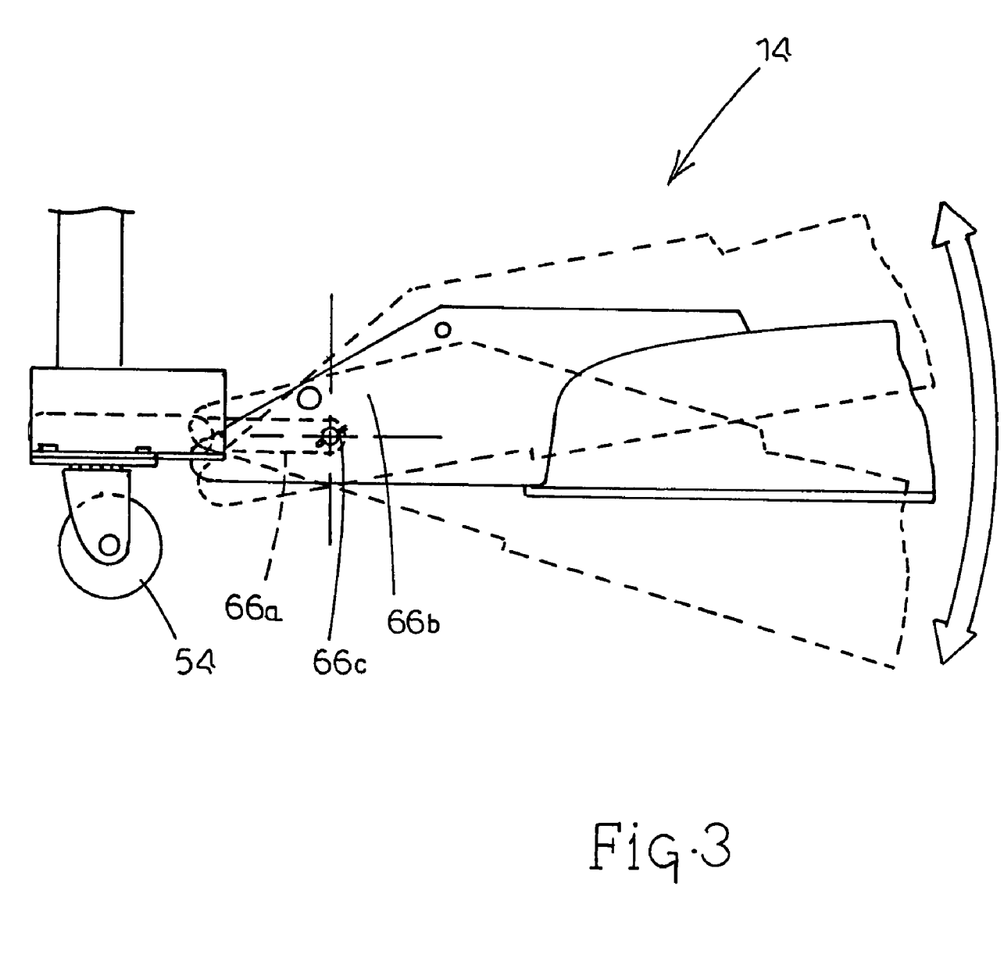
FIG. 3 is a fragmentary side elevational view illustrating the movement of a mower deck about a transverse axis.
Figure 4:
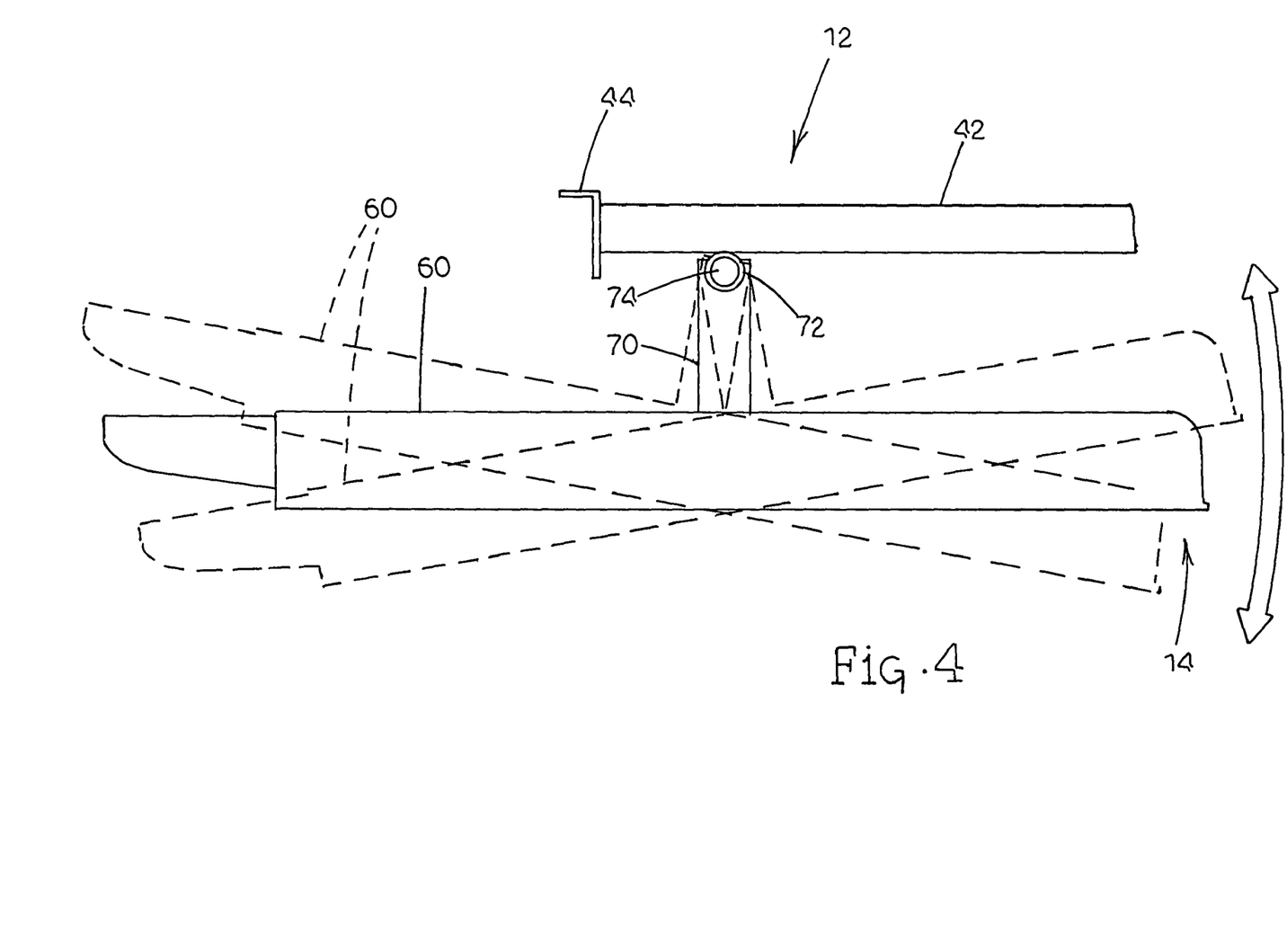
FIG. 4 is a fragmentary elevational view illustrating the movement of the mower deck about a longitudinal axis.

Each of the mower decks 14 and 16 are movable mounted to the frame structure 12. That is, each of the mower decks 14 and 16 can float and move up and down with respect to the frame structure 12 as the frame structure 12 and mower decks 14 and 16 traverse the ground. The front portion of the mower decks 14 and 16 are connected to the frame structure 12 about a generally transverse axis. This means that the rear portion of each of the mower decks 14 and 16 can float up and down about this transverse axis. Additionally, each mower deck 14 and 16 is connected to the frame structure 12 about a longitudinal axis, which permits the respective mower decks 14 and 16 to tilt or float from side to side.

Turning to the mower decks 14 and 16, each mower deck includes a housing 60. Although not specifically shown, each housing houses one or two rotary blades. Rotatively mounted to the front of the housing 60 is pair of front wheels 62. Disposed about the rear portion of each housing 60 is a rear wheel 64 that forms a part of a height adjustment assembly.

As noted earlier, the front of each mower deck 14 and 16 is pivotally connected to the frame structure 12. In particular, this front connection is achieved by a front pivot connector indicated generally by the numeral 66. Connector 66 includes a pair of spaced apart plates 66a that extend rearwardly from the lower transverse member 32. Further, there is provided a pair of plates 66b that extend forwardly from the front of each mower deck 14 and 16. A pivot pin 66c interconnects the plates 66a and 66b and forms a generally transverse axis with respect to the direction of travel of the frame structure 12.

Further, an intermediate portion of each mower deck 14 and 16 is coupled or attached to the frame structure 12. As illustrated in FIG. 1, there is a longitudinal pivot connection between each mower deck 14 and 16 and the frame structure 12. This pivot connection comprises an upright support 70 that extends upwardly from the top of a respective mower deck. Adjacently disposed is a frame connector 72 that extends from the frame structure 12. A pivot pin 74 interconnects the frame connector 72 with the upright support 70, thereby pivotally mounting the entire mower deck 14 or 16 to the frame structure 12.

Mounted on the frame structure 12 is a power source. More particularly, the power source is mounted on platform 48. As seen in the drawings, the platform 48 and the power source 18 are disposed about a central rear portion of the frame structure. Because of the weight of the power source 18, this tends to cause the center of gravity of the entire structure shown in FIG. 1 to be located toward the central rear portion of the lawn mower system 10.

Power source 18 is, in a preferred embodiment, in the form of an internal combustion engine 80. Details of the internal combustion engine 80 and its components are not dealt with \because such is not, per se, material to the present invention and because such internal combustion engines are well known and appreciated by those skilled in the art. Nevertheless, as seen in the drawings, the internal combustion engine includes a gas tank 82 and a battery 84. Further, extending downwardly from the lower portion of the internal combustion engine 80 is an output drive shaft 86.

Turning now to the drive train 20 of the present invention, the drive train includes an engine drive sheave 90 secured to the output shaft 86 of the internal combustion engine 80. Disposed adjacent the drive sheave 90 is an idler sheave 91. See FIG. 2. Disposed on each mower deck 14 and 16 is a pair of drive sheaves 92 and 94. Each drive sheave 92 and 94 is operatively connected to a shaft that extends through the mower deck and connects to a rotary blade. Therefore, by driving the drive sheaves 92 and 94 on each mower deck, the rotary blades housed within the respective mower deck is driven. In addition to the drive sheaves 92 and 94, there is rotatively mounted on each mower deck a clutch sheave 98. Clutch sheave 98 is bodily movable between engaged and disengaged positions. The movement of each clutch sheave 98 is controlled by a clutch handle 100. As viewed in FIG. 2, each clutch handle 100 is movable laterally back and forth and in the process moves the connected clutch sheave 98 between engaged and disengaged positions. Therefore, when the internal combustion engine 80 is cranked, for example, the clutch handle 100 is positioned such that the clutch sheave 98 is in a disengaged position. Further, there is provided any number of idler sheaves 102. In this case, as viewed in FIG. 2, there is provided an idler sheave 102.

Figure 2:
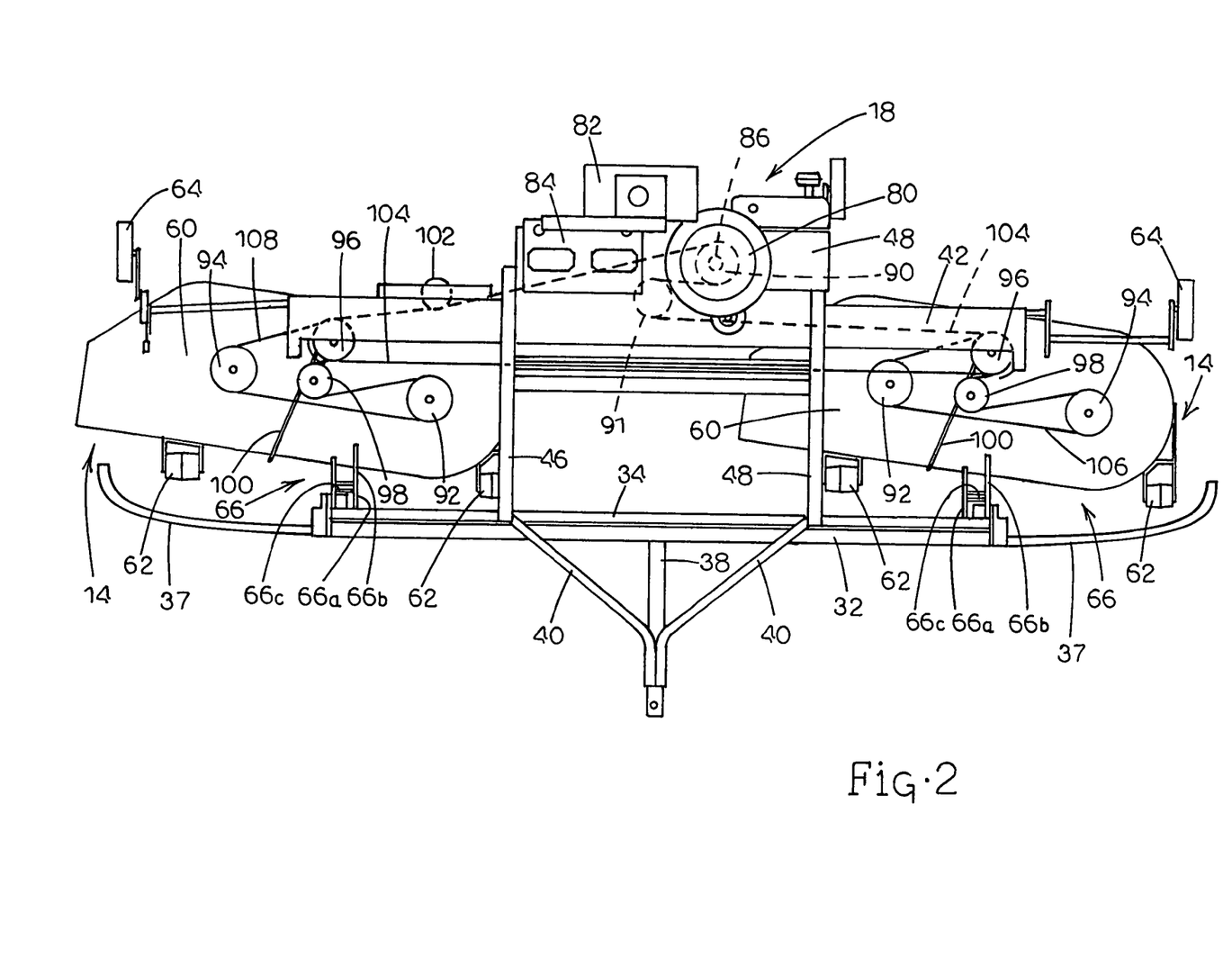
FIG. 2 is a top plan view of the lawn mower system with portions removed to illustrate the drive train between the power source and the respective mower decks.

The drive train further includes a pair of jackshafts with each jackshaft being mounted adjacent a respective mower deck. Each jackshaft includes a driven sheave 96. As seen in FIG. 2, the driven sheaves 96 are mounted to the top of the jackshaft. Secured below the driven sheaves 96 on each jackshaft is another sheave (not shown), referred to as the jackshaft drive sheave.

There is provided a series of three belts 104, 106, 108 that transfer power from the power source 18 to the drive sheaves 92 and 94 mounted on the mower decks 14 and 16. More particularly, drive belt 104 is trained around the drive sheave 90 mounted to the output shaft 86 of the power source 18. From drive sheave 90, belt 104 is trained around idler sheave 91 and then extends around the driven sheave 96 mounted to the top of the respective jackshafts. Therefore, as the output shaft 86 of the power source 18 turns, it follows that the drive sheave 90 drives the main drive belt 104 which through the driven sheaves 96 drive the pair of jackshafts.

Driving torque associated with the jackshafts and the jackshaft drive sheaves is in turn imparted to the drive sheaves 92 and 94 on the mower decks 14 and 16 by the other two belts 106 and 108. Viewing mower deck 14 and FIG. 2, it is seen that belt 106 is trained around the lower sheave on the jackshaft (the jackshaft drive sheave) and thereafter extends around the clutch sheave 98 and the two drive sheaves 92 and 94 on the mower deck. Therefore, as the power source 18 is operated, the driving torque associate therewith is transferred from its output shaft 86 to the shafts driven by the sheaves 92 and 94, which in turn drive the blades within the housings 60.

The lawn mower system 10 of the present invention has many advantages. Among the advantages is that both mower decks are driven by a single power source 18. In the case of the embodiment illustrated herein, there is provided two mower decks but it is understood that the frame structure could carry more than two mower decks.

As seen in FIG. 2, the internal combustion engine 80 is mounted about the rear of the frame structure 12 and generally centrally between the outboard ends of the entire lawn mower system 10. This effectively places the center of gravity of the entire system 10 about the central and rear portion of the entire structure. This enables the tongue 38 to be lifted and the entire lawn mower system rotated to an upright position where the engine 80 rests adjacent the ground and the mower decks 14 and 16 lie in a vertical plane. In this configuration, the rotary blades within the housings 60 are easy to service and maintain. Further, the entire system 10 can be serviced when assuming this position.

In the end, the lawn mower system 10 of the present invention is relatively simple in design, practical and relatively inexpensive. By coupling a number of unpower mower decks to a trailing frame structure and simply utilizing a single power source to drive each of the mower decks, enables a home owner or small farmer to mow a substantial area of lawn or pasture without investing substantial money in a more expensive and complicated mowing system. Further, the individual mower decks 14 and 16 are coupled to the frame structure in a way that enables the mower decks to float and move with respect to the frame structure and to provide an even and uniform cut.

In FIGS. 5-9 a second embodiment for the lawn mower system of the present invention is shown therein and indicated generally by the numeral 200. Lawn mower system 200 is adapted to be pulled behind a tractor 206 and basically comprises a main frame or power source frame indicated generally by the numeral 202 and, in the case of the particular embodiment shown herein, includes two mower decks indicated generally by the numeral 204. As will be appreciated from subsequent portions of this disclosure, the main frame supports an internal combustion engine which in turn drives the two mower decks 204 disposed on opposite sides of the main frame 202. In the embodiment illustrated herein, the main frame 202 lies centrally behind the tractor 206 and lies between the two mower decks 204. As such, in this particular embodiment the main frame does not include a blade and therefore it does not cut grass or vegetation that it traverses. In this particular embodiment, the tractor 206 is provided with a belly mounted mower that cuts a swath of grass that underlies the tractor 206 and which would accordingly correspond to the area traversed by the main frame 202.

Figure 5:
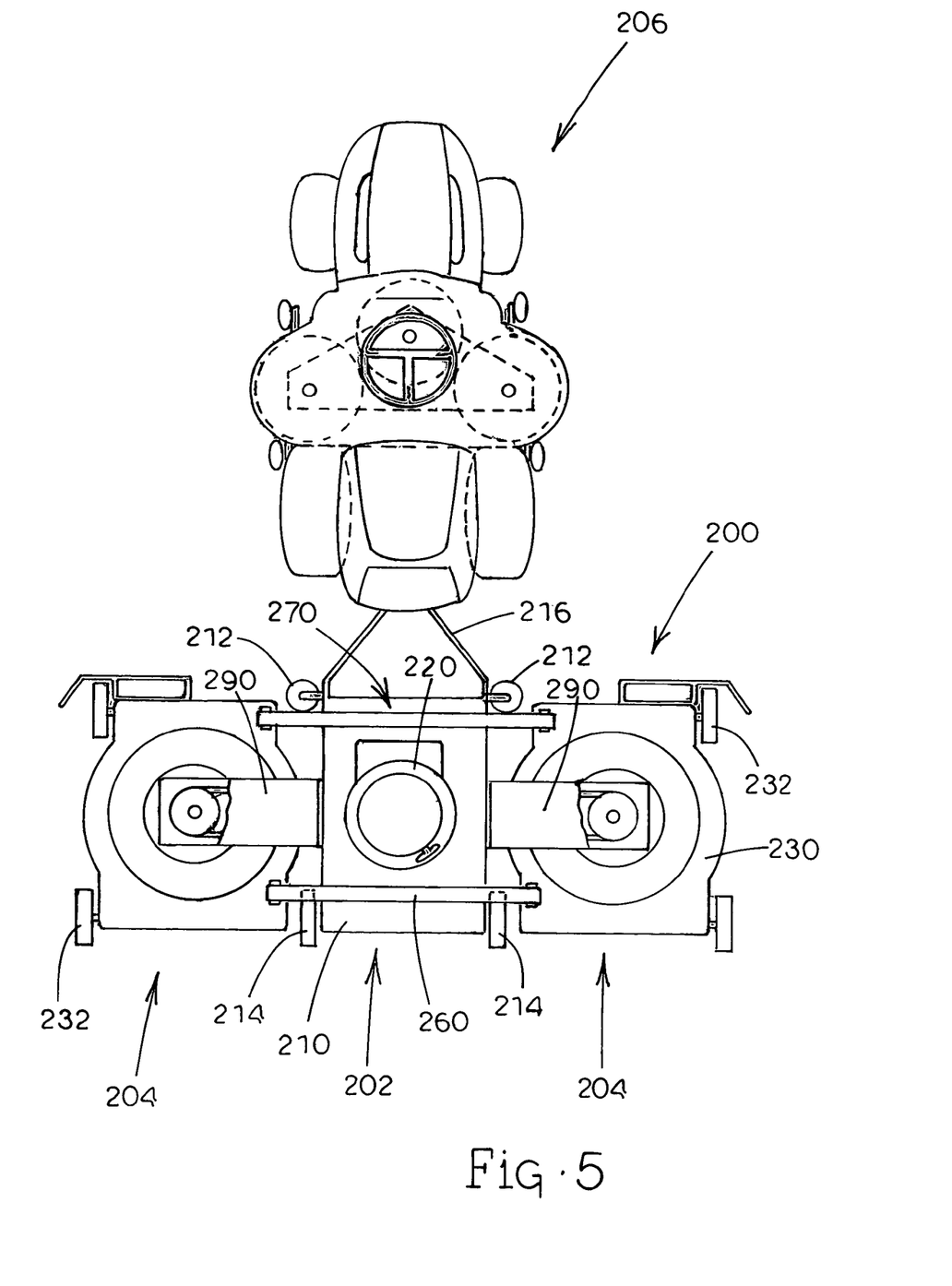
FIG. 5 is a top plan view of a second embodiment for the lawn mower system of the present invention.

Turning to a more detailed discussion of the lawn mower system 200, the main frame 202 includes an upper platform 210. Platform 210 may be square or rectangular or other shapes for that matter. Platform 210, as seen in FIG. 5, includes a front portion, a rear portion and a pair of opposed side portions.

Mounted on the front portion of the main frame 202 is a pair of spaced apart caster wheels 212. Mounted to the rear of the main frame 202 is a pair of conventional rear wheels 214. It will be appreciated by those skilled in the art that the height of these wheels with respect to the platform 210 can be adjusted. Further, there is provided a tongue 216 that projects forwardly from the front portion of the main frame 202 to where a portion of the upper tongue is adapted to connect to the tractor 206. The tongue 216 can assume various designs and can be adjustable in various ways.

Figure 6:
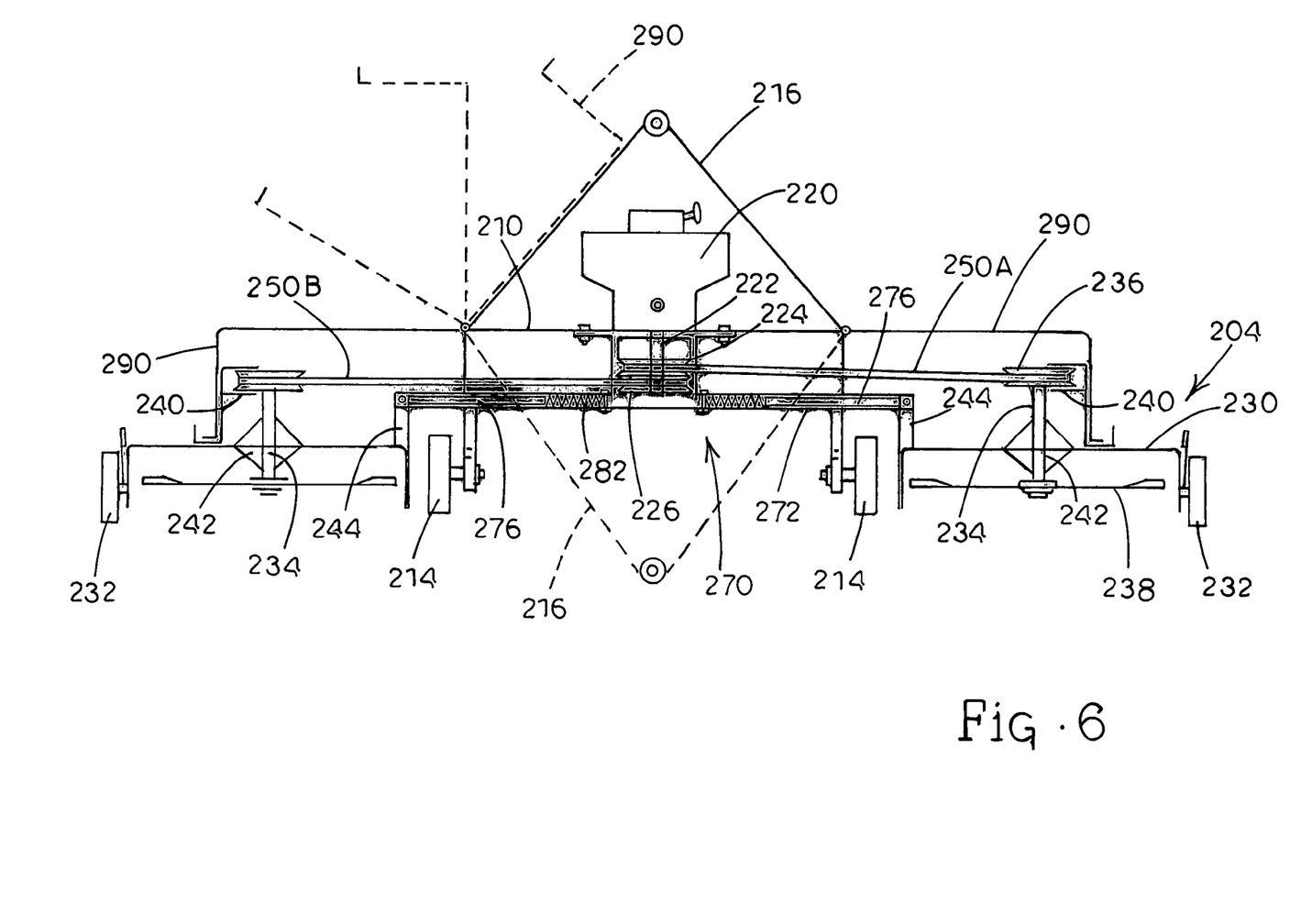
FIG. 6 is a schematic elevational view of the lawn mower system of FIG. 5.

Mounted on the platform 210 of the main frame 202 is a power source 220. In the case of the design shown in FIGS. 5-9, the power source 220 is in the form of an internal combustion engine. As seen in FIG. 6, for example, the internal combustion engine 220 is mounted to the platform 210 and projects upwardly therefrom. Extending from the internal combustion engine 220 downwardly through the platform 210 is a drive shaft 222. Secured to the drive shaft 222 and rotatable therewith is a pair of drive sheaves 224 and 226. Although not particularly shown, the lawn mower system 10 could be provided with a mechanical clutch, such as a centrifugal clutch which could control the engagement and disengagement of a belt drive, to be described hereafter.

Turning to the mower decks 204, each mower deck includes a housing 230. Provided on the outboard side of each housing 230 is a pair of wheels, a front wheel 232 and a rear wheel 232. Both of these wheels can be adjusted with respect to the housing 230. Rotatively journaled within the housing 230 is a drive shaft 234. Drive shaft 234 is rotatively contained within a bearing assembly which is indicated schematically at 242. Secured to the upper end of the drive shaft 234 is a driven sheave 236. The lower portion of the drive shaft 234 connects directly to a rotary blade 238. Secured to the top of the housing 230 adjacent the drive shaft 234 is a belt guide 240. Note in the drawing that belt guide 240 is secured to the top of the housing 230 and extends upwardly therefrom to where the belt guide includes a pair of vertically spaced projections that extend over and under the adjacent driven sheave 236.

As will be discussed subsequently herein, each mower deck 204 is movably connected to the main frame 202. To provide for this connection, each mower deck 204 includes a pair of upstanding connectors 244 that are disposed on the inboard side of the mower deck 204. The connectors 244 are spaced apart with one connector being disposed about the front portion of the housing 230 while another connector is disposed about the rear portion of the housing 230. In any event, the connectors 244 are aligned along one side of each mower deck 204.

A drive or drive assembly is interconnected between the power source 220 and the respective mower decks 204. In this case, a belt drive assembly is provided. However, it should be understood that other type of drives such as a drive shaft or a hydraulic drive could be provided. In the embodiment illustrated in FIGS. 5-9, the drive comprises a pair of drive belts 250A and 250B. Note in FIG. 6 where drive belt 250A is trained around the upper drive sheave 224 associated with the power source 220 and is also trained around the drive sheave 236 which, as viewed in FIG. 6, is associated with the mower deck 204 disposed on the right side of the main frame 202. In like fashion, the lower drive belt 250B is connected between the lower drive sheave 226 associated with the power source 220 and the drive sheave 236 associated with the mower deck 204 disposed on the left side of the main frame 220, again as viewed in FIG. 6. Therefore, it is appreciated that the driving torque produced by the power source 220 and outputted through the drive shaft 222 associated with the power source 220 is transferred to the blades 238 of the respective mower decks 204.

As discussed herein before, the mower decks 204 are pivotally connected to opposed sides of the main frame 202. In this case, there is provided a front connection and a rear connection. As seen in FIG. 5, a rear crossbar 260 is secured to the main frame 202 and is pivotally connected to each of the rear connectors 244 that extend upwardly from a rear portion of the respective platforms 210. The rear crossbar 260 is pivotally connected to the rear connectors 244 by a pair of pivot pins. This connection allows the respective mower decks to pivot upwardly and downwardly with respect to the main frame 202, but generally prevents the mower decks 204 from moving side to side with respect to the main frame 202.

There is also a front connection that exists between the main frame 202 and each of the mower decks 204. However, the front connection is made at least partially through a belt tensioner assembly. As can be seen from viewing FIGS. 6-9, the front portions of the respective mower decks 204 are permitted to move at least slightly outwardly and inwardly with respect to the main frame 202. This is achieved through a belt tensioner indicated generally by the numeral 270 and shown particularly in FIG. 9. But as can be seen from the drawings, the belt tensioner 270 provides for pivotal movement of the mower deck 204 with respect to the main frame 202 but also includes a pivotable connection that is aligned with the pivot connections just described with respect to the rear crossbar 260 that again permits the mower decks 204 to pivot up and down with respect to the main frame 202.

Figure 9:
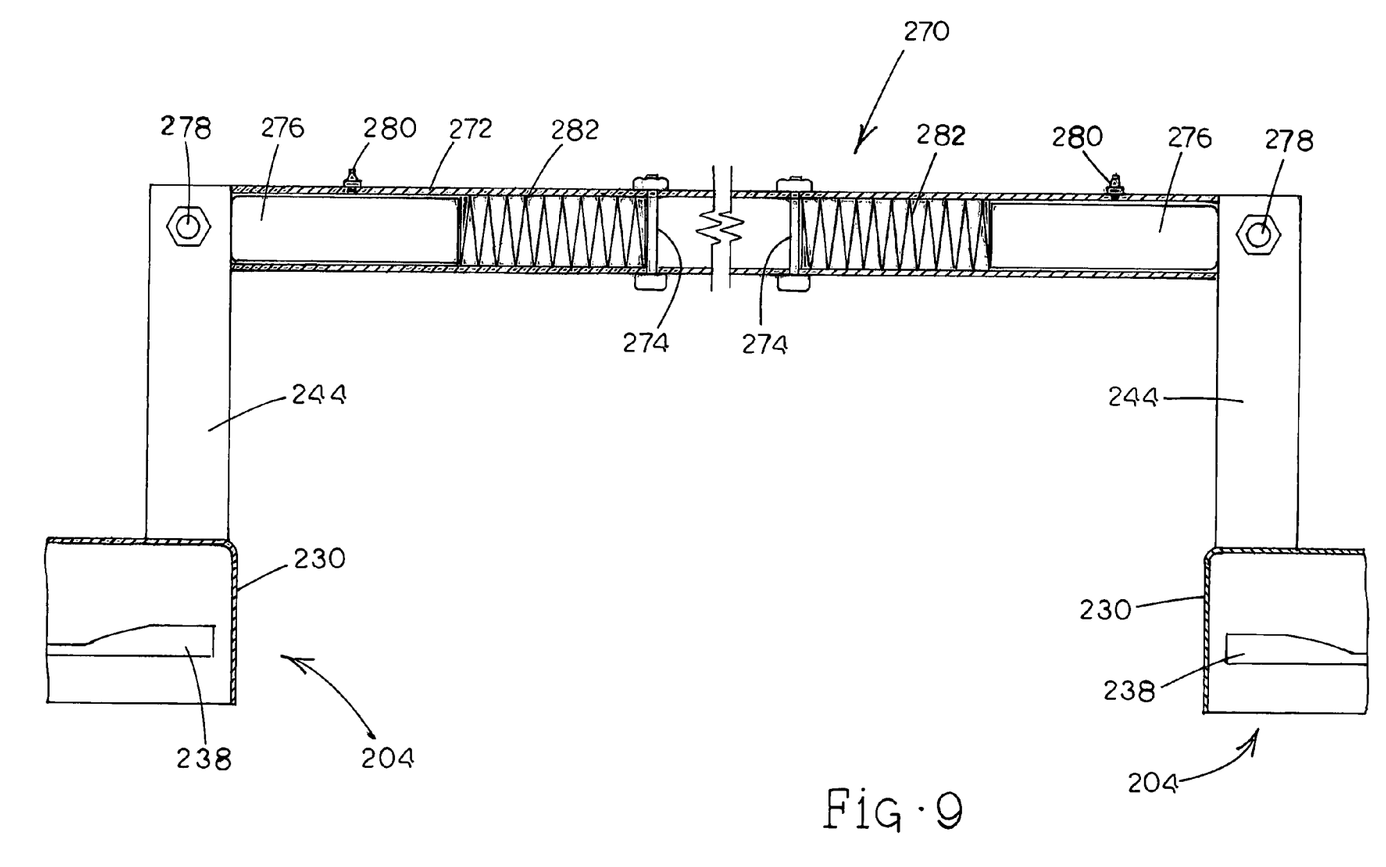
FIG. 9 is a schematic illustration showing the basic structure of the belt tensioner device of the present invention.

Turning to the belt tensioner 270, the same includes an elongated sleeve 272 that extends across the front portion of the main frame 202 and is connected thereto. Outer portions of the sleeve 242 project on over to an area adjacent the front portion of each of the mower decks 204. Provided in the elongated sleeve 272 is a pair of stops 274. A pair of coil springs 282 are contained within the sleeve 272. Each coil spring 282 extends from one stop 274 outwardly therefrom. Also contained in each end of the sleeve 272 is a movable member 276 which could be in the form of a shaft, tube or other type of stock. Each member 276 includes an outboard end that extends from the sleeves 272 and is connected to a front connector 244 extending up from the mower deck 204 by a pivot pin connection 278. Pivot pin connections 278 are generally aligned with the pivot connections that exist about the rear of the mower decks 204. This, of course, permits each mower deck 204 to pivot or rotate about a longitudinal axis that extends longitudinally along the inboard side of each mower deck 204.

Belt tensioner 270 functions to maintain an appropriate degree of tension on the belt drives 250A and 250B. That is, the springs 282 engage the movable members 276 in the sleeve 272 and tend to bias or push the movable members 276 outwardly. In the process, the front connectors 244 as shown in FIG. 9 also tend to be pushed outwardly. While the springs 282 bias the mower decks 204 outwardly it should be appreciated that this biasing action is generally limited. The size and strength of the springs 282 are selected to limit the biasing action. Further the belts 250A and 250B restrict the degree of movement of the mower decks 204 with respect to the main frame 202. However, the design is intended to supply sufficient biasing forces to maintain a proper belt tension within the two drive belts 250A and 250B.

Further, the gang type lawn mower system of the present invention is provided with a pair of belt guards 290. As shown in FIGS. 5 and 6, each belt guard 290 is pivotally connected to the main frame 202 and extends outwardly therefrom over a portion of each mower deck 204. In particular, each belt guard assumes a general L-shape. As such the belt guard 290 at least partially encloses the respective belts about the top and the outer sides.

Figure 7:
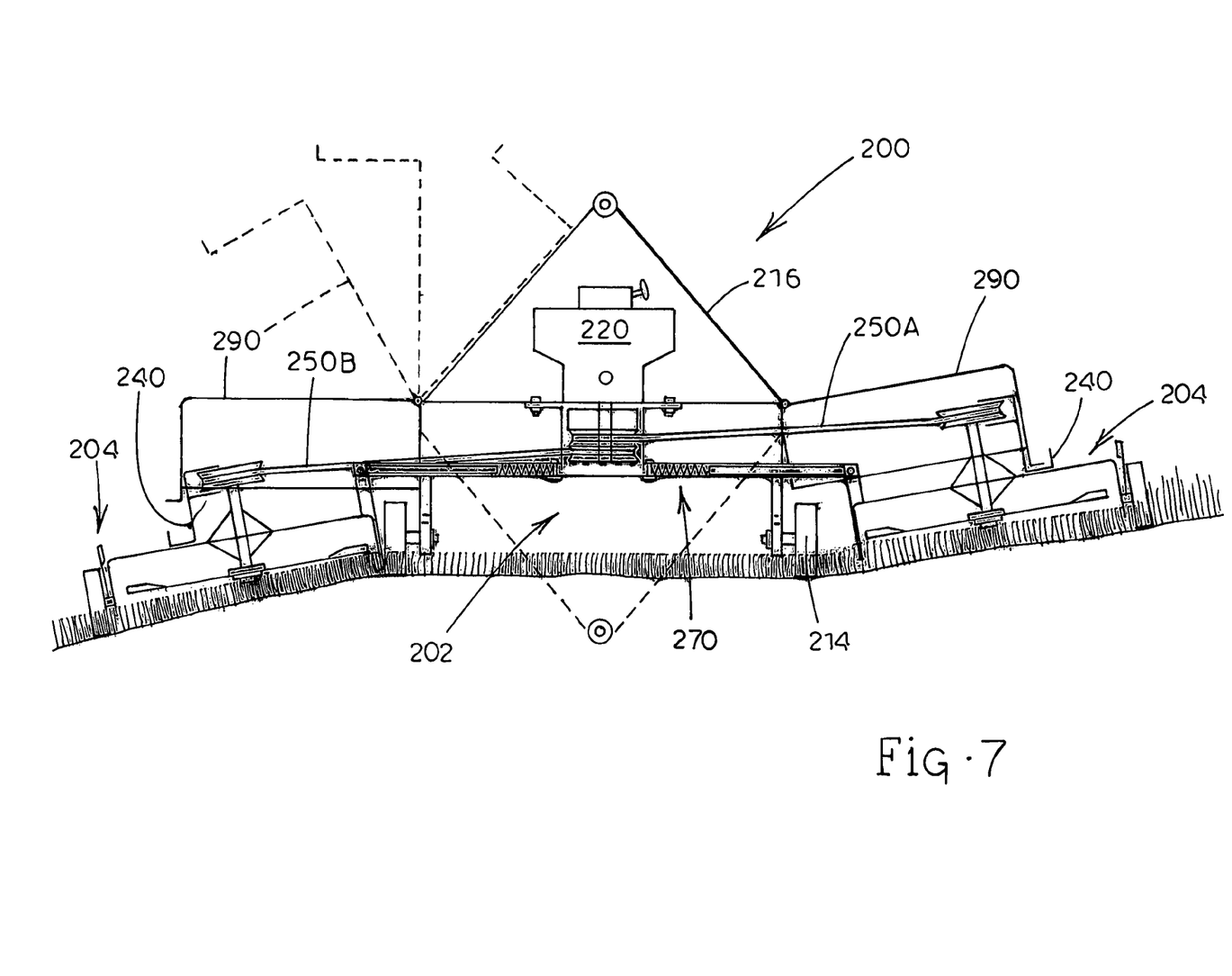
FIG. 7 is a schematic elevational view similar to FIG. 6 but showing the mower decks floating with respect to the main frame.

Belt guards 290 are particularly configured with respect to the main frame 202 and the respective mower decks 204 to limit the degree of pivotable movement of the respective mower decks when the mower decks assume the lowered operative position shown in FIGS. 6 and 7. It is anticipated that in normal operations that the mower decks should have the capacity or ability to pivot approximately 15° with respect to the main frame 202 as the lawn mower system 200 traverses the ground. However, it may be beneficial to limit the pivotal movement during operation to approximately no more than 15° to 20°. In any event, the belt guards are configured to cooperate with adjacent structure to limit the pivotal movement of the respective mower decks during normal operation. This is illustrated in FIG. 7. Note that when each respective mower deck 204 tilts a certain amount, that the outer portions of the belt guards 290 will engage the belt guides 240. This engagement will cause the belt guards 290 to act as a stop and will prevent the mower decks from continuing to pivot either upwardly or downwardly with respect to the main frame 202 past a predetermined angle which, as referred to above, could be in the range of 15° to 20°.

Figure 8:
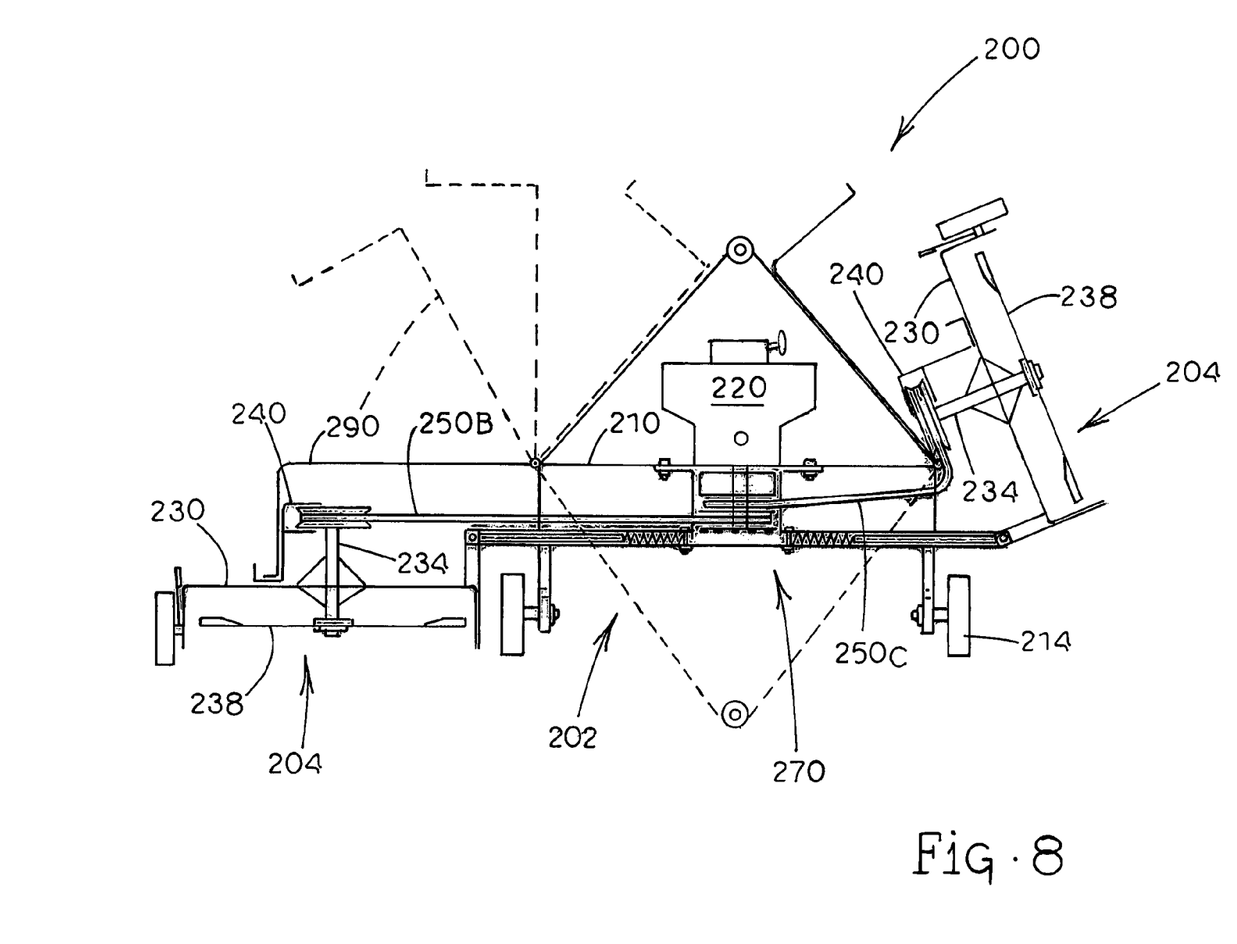
FIG. 8 is a schematic elevational view of the embodiment of FIG. 5 showing one of the mower decks in an elevated stowed position.

One feature of the present invention is that the mower decks 204 can be pivoted upwardly to an elevated and stowed position. This is illustrated in FIG. 8 with respect to the mower deck 204 disposed on the right side of the main frame. When the mower deck 204 is pivoted upwardly to the stowed position shown therein, it is seen that a portion of the mower deck 204 overlies at least a portion of the main frame 202. That is, as seen in FIG. 8, the mower deck 204 disposed in the stowed position has been rotated counterclockwise through an angle greater than 90°. Thus the underside of the mower deck is said to face outwardly or at least partially upwardly. In the case of the embodiment of FIGS. 5-9, it is seen that prior to rotating the mower deck 204 to the stowed position, again as shown in FIG. 8, the overlying belt guard 290 is lifted and rotated to a stowed position. The structure of the lawn mower system 10 can be designed such that the degree of rotation afforded to the respective mower decks 204 can vary. For example, the configuration of the components can be varied such that the mower deck 204, as shown in FIG. 8 in the elevated and stowed position, could be further rotated counterclockwise. This is simply a matter of changing various structural dimensions.

Therefore, it is appreciated that the gang type lawn mower system 10 shown in FIGS. 5-9 is of a light weight and compact design. Indeed, when the mower units or mower decks 204 are pivoted to the elevated stowed position, the entire lawn mower system can fit in a small space and can be easily stored or transported from one location to another location.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A gang type lawn mower system adapted to be pulled behind a tractor, comprising:
    a. a wheel supported main frame;
    b. a power source mounted on the main frame;
    c. at least two mower decks connected to the main frame, each mower deck having a rotary blade;
    d. each mower deck being movably mounted to the main frame and movable from an operative lowered position where the mower deck is operative to cut grass to an elevated stowed position;
    e. a drive interconnected between the power source and each of the mower decks for driving each of the mower decks whereby the mower decks are driven by a single power source mounted on the main frame; and
    f. wherein in moving from the operative position to the stowed position each of the mower decks moves through an angle of at least 91°.

2. The gang type lawn mower of claim 1 wherein the main frame lies between two mower decks, and wherein in the lowered operative position the mower decks extend outwardly from the main frame;
    a. wherein the main frame does not include a blade for cutting grass; and
    b. each mower deck being pivotally connected along one side of the main frame such that when the mower deck assumes a stowed position, the underside of the mower deck faces at least partially upwardly and the entire mower deck is supported by the main frame.

3. The gang type lawn mower system of claim 1 wherein the drive interconnected between the power source and the mower decks include a belt drive; and wherein the gang type lawn mower system includes a belt tensioner for maintaining a tension on the belt drive.

4. The gang type lawn mower system of claim 3 wherein the belt tensioner includes a spring biased telescoping assembly that tends to bias a portion of the mower decks outwardly from the main frame.

5. The gang type lawn mower system of claim 3 wherein the belt tensioner includes a telescoping sleeve assembly.

6. The gang type lawn mower system of claim 1 wherein the main frame includes at least two spaced apart caster wheels disposed on the front portion of the main frame.

7. The gang type lawn mower system of claim 1 including at least one belt guard extending from the main frame over a portion of one mower deck for guarding a belt drive that forms a part of the drive interconnected between the power source and the mower decks.

8. The gang type lawn mower system of claim 7 wherein each mower deck can move relative to the main frame and wherein the belt guard is operative to limit the movement of the mower deck.

9. The gang type lawn mower system of claim 8 wherein the belt guard limits the movement of the mower deck to an angle of approximately 15° with respect to the main frame.

10. The gang type lawn mower system of claim 1 wherein the main frame includes an upper platform having the power source mounted thereon.

11. The gang type lawn mower system of claim 10 wherein the power source includes a drive shaft extending downwardly beneath the upper platform and wherein the drive shaft has secured thereon a pair of drive sheaves that drive a belt drive that transfers torque from the drive shaft of the power source to a pair of drive shafts associated with the mower decks.

12. A gang type lawn mower system adapted to be pulled behind a tractor, comprising:
    a. a power source frame adapted to attach to the tractor and having an area for receiving and supporting an internal combustion engine thereon;
    b. an internal combustion engine mounted on the power source frame and having an output power shaft extending therefrom;
    c. the power source frame having a plurality of wheels and a pair of opposed side areas;
    d. at least two mower decks movably mounted to the power source frame, each mower deck movably mounted to one side area of the power source frame such that the power source frame lies between the two mower decks and wherein each mower deck is operative to move independently of the power source frame;
    e. each mower deck having a blade associated therewith for cutting grass;
    f. a drive extending from the power source frame to each of the mower decks and wherein the drive transfers power from the internal combustion engine to each of the mower decks so as to drive the blades associated with the mower decks;
    g. each mower deck being movable with respect to the power source frame from a lowered operative position for cutting grass to an elevated stowed position;
    h. wherein in the elevated stowed position each mower deck is turned at least partially on the mower deck's side such that an underside of the mower deck faces outwardly or at least slightly upwardly; and
    i. wherein the mower decks are exclusively driven by the internal combustion engine mounted on the power source frame that in operation trails the tractor.

13. The gang type lawn mower system of claim 12 wherein each mower deck is pivotally connected to one side of the power source frame through one or more pivot connections that permit each mower deck to swing about a longitudinal axis that extends adjacent the side area of the power source frame.

14. The gang type lawn mower system of claim 13 including a belt tensioner assembly mounted to the power source frame and extending outwardly therefrom for connection to each of the mower decks and wherein the belt tensioner assembly tends to bias each of the mower decks outwardly; and wherein the drive interconnected between the power source frame and the mower decks comprises a belt drive.

15. The gang type lawn mower system of claim 1 wherein in the stowed position at least a portion of the mower deck overlies a portion of the mainframe.

16. The gang type lawn mower system of claim 15 wherein in the stowed position the underside of the mower deck faces upwardly and at least slightly outwardly.

17. The gang type lawn mower system of claim 1 including a tongue pivotally connected to the mainframe about a transverse axis such that the tongue can move up and down about the axis.

18. The gang type lawn mower system of claim 17 including front and rear wheels secured to the mainframe.

19. The gang type lawn mower system of claim 1 including a tongue pivotally connected to the mainframe about a transverse axis such that the tongue can move up and down with respect to the mainframe about the axis; and wherein there is provided front and rear wheels mounted to the mainframe.

20. The gang type lawn mower system of claim 12 wherein each mower deck is movable through an angle of at least 91° when moving from the operative position to the stowed position.

21. The gang type lawn mower system of claim 20 wherein each deck is pivotally connected to one side of the power source frame and pivotable through an angle of at least 91° as the mower deck moves between the operative and stowed position.

22. The gang type lawn mower system of claim 12 wherein the power source frame includes an upper platform having the power source mounted thereon and wherein the power source includes a drive shaft extending downwardly beneath the upper platform and where the drive shaft has secured thereon a pair of drive sheaves that drive a belt that transfers torque from the drive shaft of the power source to a pair of drive shafts associated with the mower decks.

23. The gang type lawn mower system of claim 12 wherein the drive includes a belt drive and a belt tensioner for maintaining a tension on the belt drive.

24. A gang type lawn mower system adapted to be pulled behind a tractor, comprising:
   a. a wheel supported mainframe;
   b. a power source mounted on the mainframe;
   c. at least two mower decks connected to the mainframe, each mower deck having a rotary blade;
   d. each mower deck being movably mounted to the mainframe and movable from an operative lowered position where the mower deck is operative to cut grass to an elevated stowed position;
   e. a drive interconnected between the power source and each of the mower decks for driving each of the mower decks whereby the mower decks are driven by a single power source mounted on the mainframe; and
   f. wherein the mainframe includes an upper platform having a power source mounted thereon, the power source including a drive shaft extending downwardly beneath the upper platform and having a pair of sheaves secured thereto that drive a belt drive that transfers torque from the drive shaft of the power source to a pair of drive shafts associated with the mower decks.

25. The gang type lawn mower system of claim 24 wherein the mower decks are movable through an angle of at least 91° as the mower deck moves from the operative position to the stowed position.

26. A gang type lawn mower adapted to be pulled behind a tractor, comprising:
   a. a wheel supported mainframe;
   b. a power source mounted on the mainframe;
   c. at least two mower decks connected to the mainframe, each mower deck having a rotary blade;
   d. each mower deck being movably mounted to the mainframe and movable from an operative lowered position where the mower deck is operative to cut grass to an elevated stowed position;
   e. a drive interconnected between the power source and each of the mower decks for driving each of the mower decks whereby the mower decks are driven by a single power source mounted on the mainframe;
   f. four wheels secured to the mainframe for supporting the mainframe;
   g. a tongue pivotally connected to the mainframe about a transverse axis that permits the tongue to move up and down with respect to the mainframe and to pivot up and down about the main axis; and
   wherein each mower deck is pivotally mounted to the mainframe and movable through an angle of at least 91° as each mower deck moves from the operative position to the stowed position.

* * * * *